US010177393B2

(12) United States Patent
Swica et al.

(10) Patent No.: US 10,177,393 B2
(45) Date of Patent: Jan. 8, 2019

(54) METHOD FOR CONTROLLING A FUEL CELL AND ASSOCIATED FUEL CELL SYSTEM

(71) Applicant: AREVA Stockage d'Energie, Aix en Provence (FR)

(72) Inventors: Jérémy Swica, Riom (FR); Julien Talois, La Ciotat (FR)

(73) Assignee: AREVA STOCKAGE D'ENERGIE, Aix en Provence (FR)

( * ) Notice: Subject to any disclaimer, the term of this patent is extended or adjusted under 35 U.S.C. 154(b) by 0 days.

(21) Appl. No.: 15/528,890

(22) PCT Filed: Nov. 24, 2015

(86) PCT No.: PCT/EP2015/077523
§ 371 (c)(1),
(2) Date: May 23, 2017

(87) PCT Pub. No.: WO2016/083388
PCT Pub. Date: Jun. 2, 2016

(65) Prior Publication Data
US 2017/0338503 A1 Nov. 23, 2017

(30) Foreign Application Priority Data
Nov. 24, 2014 (FR) ..................................... 14 61374

(51) Int. Cl.
*H01H 13/70* (2006.01)
*H01H 25/00* (2006.01)
(Continued)

(52) U.S. Cl.
CPC ....... *H01M 8/04992* (2013.01); *H01M 4/921* (2013.01); *H01M 8/04388* (2013.01);
(Continued)

(58) Field of Classification Search
CPC ...... H01M 2008/1095; H01M 8/04992; H01H 4/921; H01H 8/04388; H01H 8/04395; H01H 8/04753
(Continued)

(56) References Cited

U.S. PATENT DOCUMENTS

2007/0166586 A1* 7/2007 Marchand ......... H01M 8/04186
429/412
2008/0038608 A1 2/2008 Yoshida

FOREIGN PATENT DOCUMENTS

DE 102008010711 A1 8/2009
JP S59111270 A 6/1984
(Continued)

OTHER PUBLICATIONS

French Search Report of priority application.

*Primary Examiner* — Anthony R. Jimenez
(74) *Attorney, Agent, or Firm* — Davidson, Davidson & Kappel, LLC

(57) ABSTRACT

A method for controlling a fuel cell (12) includes the following steps: measuring the fluid pressure in a first compartment from the anode and cathode compartments of the fuel cell (12); calculating a first target pressure for the fluid pressure in the second compartment of the fuel cell (12), the first target pressure depending on the fluid pressure measured in the first compartment; stabilizing the fluid pressure in the second compartment to the first target pressure; measuring the fluid pressure in the second compartment; calculating a second target pressure for the fluid pressure in the first compartment, the second target pressure depending on the fluid pressure measured in the second compartment; and stabilizing the fluid pressure in the first compartment at the second target pressure.

12 Claims, 2 Drawing Sheets

(51) Int. Cl.
*H01H 25/04* (2006.01)
*H01M 8/04992* (2016.01)
*H01M 8/0438* (2016.01)
*H01M 8/04746* (2016.01)
*H01M 4/92* (2006.01)
*H01M 8/1018* (2016.01)

(52) U.S. Cl.
CPC ... *H01M 8/04395* (2013.01); *H01M 8/04746* (2013.01); *H01M 8/04753* (2013.01); *H01M 8/04783* (2013.01); *H01M 2008/1095* (2013.01)

(58) Field of Classification Search
USPC ........ 429/400, 402, 403, 415–422, 443–444, 429/446, 449, 452, 454
See application file for complete search history.

(56) References Cited

FOREIGN PATENT DOCUMENTS

| | | |
|---|---|---|
| JP | 2010103075 A | 5/2010 |
| JP | WO2011089502 A1 | 7/2011 |

* cited by examiner

METHOD FOR CONTROLLING A FUEL CELL AND ASSOCIATED FUEL CELL SYSTEM

The present invention relates to a method for controlling a fuel cell, the fuel cell comprising at least one electrochemical cell for generating an electric current by reaction of an oxidizing fluid, flowing in a cathode compartment of the fuel cell, with a reducing fluid flowing in an anode compartment of the fuel cell, the method being of the type comprising the following steps:
  measuring the fluid pressure in a first compartment from the anode and the cathode compartments,
  calculating a first target pressure for the fluid pressure in the second compartment, said first target pressure depending on the fluid pressure measured in the first compartment, and
  stabilizing the fluid pressure in the second compartment at the first target pressure.

The invention also relates to a fuel cell system, the type comprising:
  a cathode compartment,
  an anode compartment,
  at least one electrochemical cell for generating an electric current by reaction of an oxidizing fluid, flowing in the cathode compartment, with a reducing fluid flowing in the anode compartment,
  a first pressure sensor, to measure a fluid pressure in a first compartment from the anode and cathode compartments,
  a first pressure regulator, to measure a fluid pressure in the second compartment,
  a control module, comprising:
    a first calculating module, to calculate a first target pressure from the pressure measured by the first sensor, and
    a first generating module, to generate a first control law of the first regulator, suitable for stabilizing the fluid pressure in the second compartment at the first target pressure,
  a second pressure sensor, to measure a fluid pressure in the second compartment, and
  a second pressure regulator, to regulate the fluid pressure in the first compartment.

BACKGROUND

Electrochemical cells are known making it possible to produce electricity through an oxidation-reduction reaction between an oxidizing fluid and a reducing fluid. In particular, fuel cells are known making it possible to produce electricity through an oxidation-reduction reaction between a fuel, comprising hydrogen, and an oxidizer, comprising oxygen. The fuel is injected into an anode conduit and the oxidizer is injected into a cathode conduit of the cell, an electrolyte layer providing the sealing between these two conduits, while allowing ion exchanges. Due to these ion exchanges, the hydrogen contained in the fuel can react with the oxygen contained in the oxidizer to yield water, while generating electrons in the anode. During the operation of the cell, a difference in potential then follows between the two sides of the electrolyte, this difference in potential being able to be used to create an electric current.

However, the differences in potential established within a fuel cell remain small, around 0.6 to 1.0 V. Consequently, to obtain a usable output voltage, the cells are most often stacked and electrically connected to one another in series, within what is commonly called a fuel cell. The anode conduits of the electrochemical cells are fluidly connected to one another within what forms an anode compartment of the fuel cell, and the cathode conduits of the electrochemical cells are fluidly connected to one another within what forms a cathode compartment of the fuel cell.

To avoid damaging the electrolyte layer of the cells, it is necessary to limit the pressure differential between the anode and cathode compartments. To that end, the fluid pressure in one of the anode and cathode compartments is generally controlled based on the fluid pressure in the other compartment, for example using an expander.

WO 2011/083502 thus discloses a method for controlling a fuel cell in which the fluid pressure in the cathode compartment is kept at a target pressure lower than a threshold pressure depending on the pressure in the anode compartment, to avoid breaking the membranes of the cells.

However, the fluid pressure in the compartment used as a reference to control the fluid pressure in the other compartment increases in an uncontrolled manner. This uncontrolled increase in the fluid pressure of the fuel cell risking damaging it greatly, it is necessary to stop the fuel cell. This results in repeated and uncontrolled mechanical stresses of the membranes of the cells, which may damage them.

SUMMARY OF THE INVENTION

One aim of the invention is to guarantee a lifetime of the electrolyte layers of the electrochemical cells of a fuel cell, while limiting the safety stoppages of the fuel cell.

To that end, a method for controlling a fuel cell of the aforementioned type is provided, further comprising the following steps:
  measuring the fluid pressure in the second compartment,
  calculating a second target pressure for the fluid pressure in the first compartment, said second target pressure depending on the fluid pressure measured in the second compartment, and
  stabilizing the fluid pressure in the first compartment at the second target pressure.

According to specific embodiments of the invention, the control method has one or more of the following features, considered alone or according to any technically possible combination(s):
  the stabilization of the fluid pressure in each compartment is done using a valve, for example a solenoid valve,
  the first target pressure is equal to the sum of the fluid pressure measured in the first compartment and a first constant, and the second target pressure is equal to the sum of the fluid pressure measured in the second compartment and a second constant,
  the control method comprises the following steps:
    computing a first pressure difference between the fluid pressure in the second compartment and the first target pressure,
    comparing the first pressure difference to a first threshold, and
    if the first pressure difference exceeds the first threshold, stopping the stabilization of the fluid pressure in the second compartment at the first target pressure, and starting the stabilization of the fluid pressure in the first compartment at the second target pressure,
  the control method comprises the following steps:
    computing a second pressure difference between the fluid pressure in the first compartment and the second target pressure, comparing the second pressure difference to a second threshold, and if the second pressure difference exceeds the second threshold, stopping the stabilization of the fluid pressure in the first compartment at the second target pressure, and starting the stabilization of the fluid pressure in the second compartment at the first target pressure.

The invention also provides a fuel cell system of the aforementioned type, wherein the control module further comprises a second calculating module to calculate a second target pressure from the pressure measured by the second sensor, and a second generating module to generate a second control law of the second pressure regulator, suitable for stabilizing the fluid pressure in the first compartment at the second target pressure.

According to specific embodiments of the invention, the control method has one or more of the following features, considered alone or according to any technically possible combination(s):

- each pressure regulator is a valve, for example a solenoid valve,
- the first target pressure is equal to the sum of the fluid pressure measured by the first sensor and a first constant, and the second target pressure is equal to the sum of the fluid pressure measured by the second sensor and a second constant,
- the control module comprises:
  - a first computing module for computing a first pressure difference between the fluid pressure measured by the second sensor and the first target pressure,
  - a first comparison module to compare the first pressure difference to a first threshold,
  - a first stoppage module, to stop the first generating module if the first pressure difference exceeds the first threshold, and
  - a first start up module, to start the second generating module if the first pressure difference exceeds the first threshold,
- the control module comprises:
  - a second computing module for computing a second pressure difference between the fluid pressure measured by the first sensor and the second target pressure,
  - a second comparison module to compare the second pressure difference to a second threshold,
  - a second stoppage module, to stop the second generating module if the second pressure difference exceeds the second threshold, and
  - a second start up module, to start the first generating module if the second pressure difference exceeds the second threshold.

BRIEF SUMMARY OF THE DRAWINGS

Other features and advantages of the invention will appear upon reading the following description, provided solely as an example and done in reference to the appended drawings, in which.

DETAILED DESCRIPTION

Figure 1:
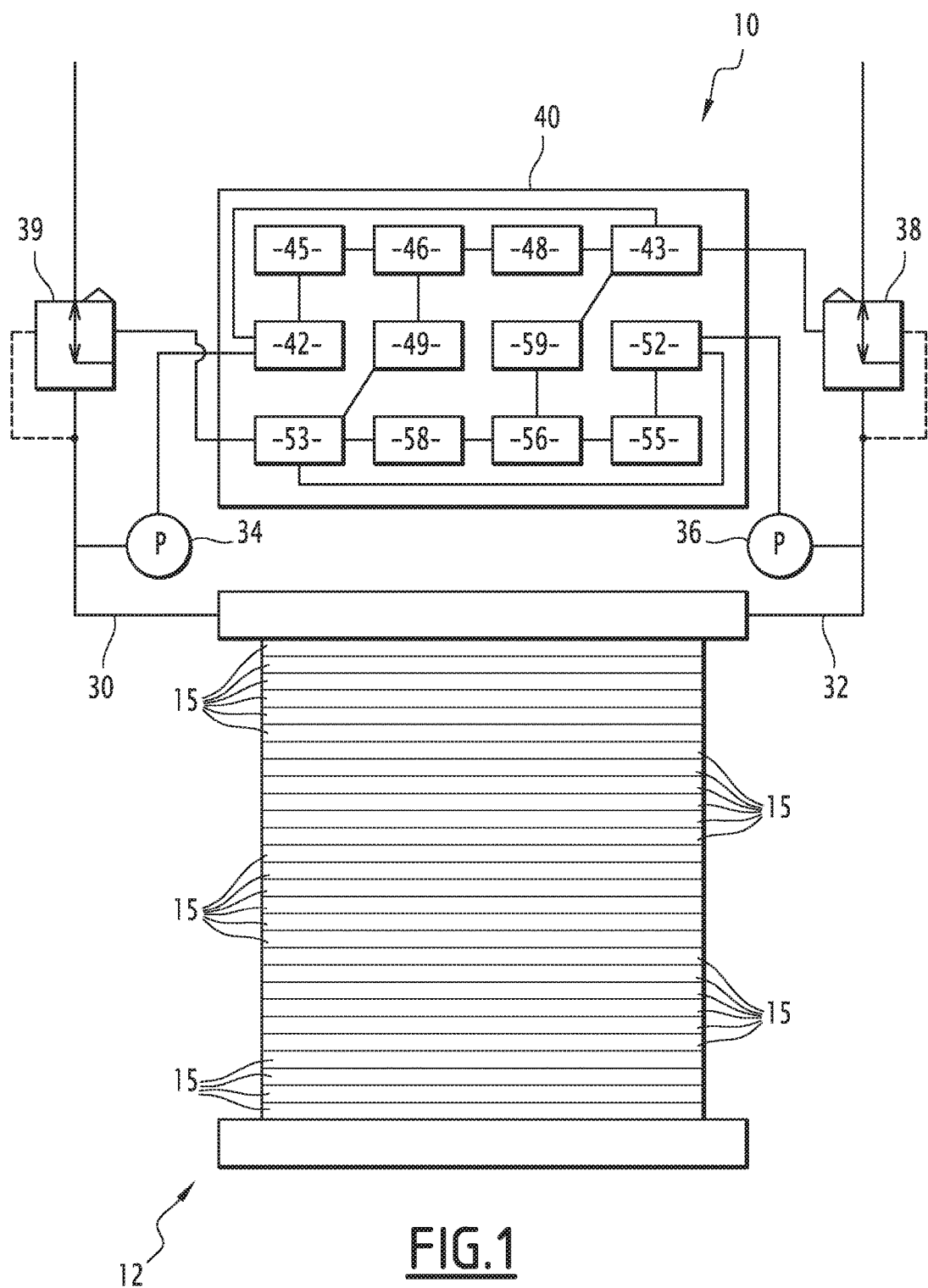
FIG. 1 is a diagram of a fuel cell system according to an embodiment of the invention.

The fuel cell system 10, shown in FIG. 1, comprises a fuel cell 12 formed by a stack of electrochemical cells 15.

Figure 2:
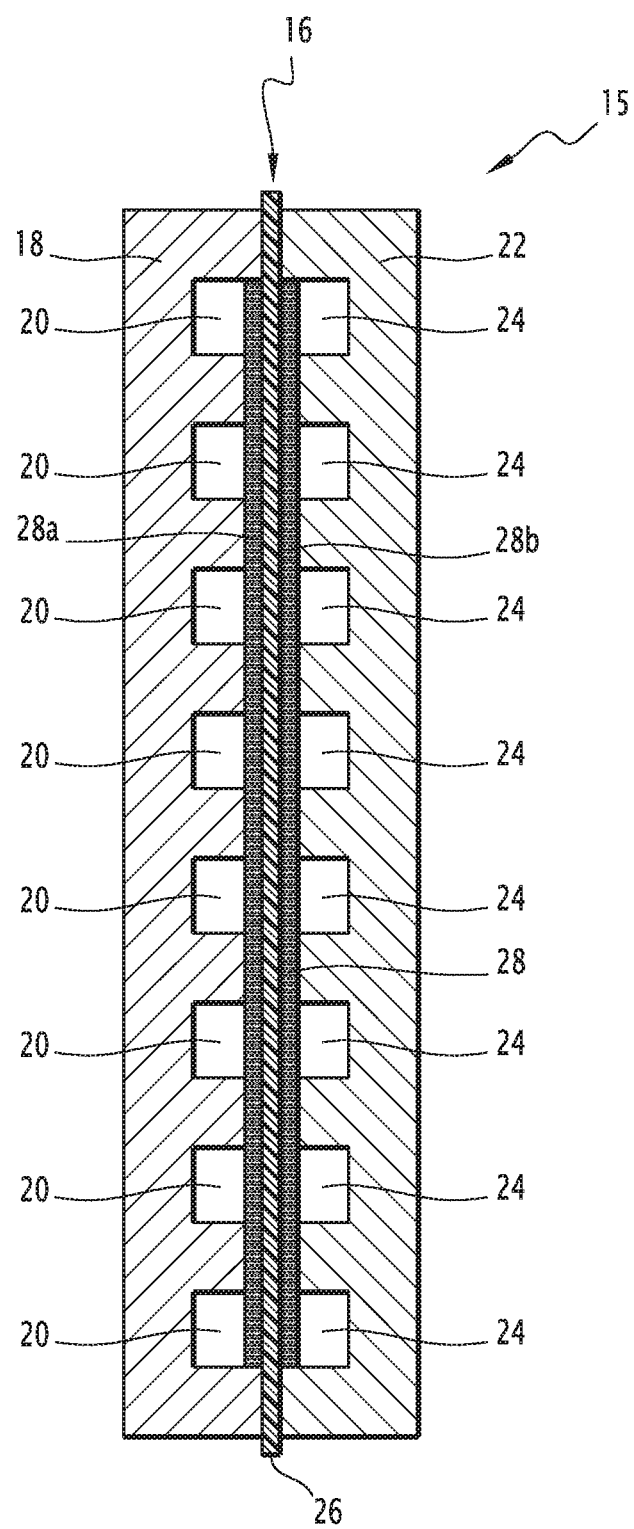
FIG. 2 is a schematic sectional view of an electrochemical cell of a fuel cell of the production system of FIG. 1.

A cell 15 of the fuel cell 12 is shown in FIG. 2. It comprises a membrane-electrode assembly 16 inserted between an anode plate 18 and a cathode plate 22.

The membrane-electrode assembly 16 comprises an ion exchange membrane 26 sandwiched between an anode 28a and a cathode 28b.

The membrane 26 electrically isolates the anode 28a from the cathode 28b.

The membrane 26 is suitable for only allowing charged ions, preferably cations, to cross through it. The membrane 26 is generally a proton exchange membrane, suitable for only allowing protons to cross through it. The membrane 26 is typically made from a polymer material.

The anode 28a and the cathode 28b each comprise a catalyzer, typically made from platinum or a platinum alloy, to facilitate the reaction.

The anode plate 18 delimits an anode channel 20 for the flow of a reducing gas along and in contact with the anode 28a. To that end, the plate 18 is provided with at least one channel arranged in the face of the plate facing the membrane-electrode assembly 16 and closed by said membrane-electrode assembly 16. The anode plate 18 is formed from an electrically conductive material, typically graphite. The reducing gas used is a gas comprising dihydrogen, for example pure dihydrogen.

The cathode plate 22 delimits a cathode channel 24 for the flow of an oxidizing gas along and in contact with the cathode 28b. To that end, the plate 22 is provided with at least one channel arranged in the face of the plate facing the membrane-electrode assembly 16 and closed by said membrane-electrode assembly 16. The cathode plate 22 is formed from an electrically conductive material, typically graphite. The oxidizing gas used is a gas comprising oxygen, for example pure oxygen, air, or a reconstituted mixture of dioxygen and a neutral gas, such as nitrogen or carbon dioxide.

The membrane 26 separates the oxidizing and reducing gases. It is positioned between the anode plate 18 and the cathode plate 22 of the cell 15 and electrically isolates them from one another.

The anode 28a is in electric contact with the anode plate 18. The cathode 28b is in electric contact with the cathode plate 22. During the operation of the fuel cell, oxidation of the reducing gas occurs at the anode 28a, causing electron and proton generation. The electrons next pass through the anode plate 18 toward the cathode 28b of the cell 15, or toward the cathode of another cell, to participate in a reduction of the oxidizing gas.

The cell 15 thus comprises two electric terminals: a negative electric terminal is formed by the anode plate 18, and a positive electric terminal is formed by the cathode plate 22.

The cell 15 is stacked with other similar cells, the anode plate 18 of each cell being in contact with the cathode plate 22 of the adjacent cell. The anode and cathode plates 18, 22 thus ensure the transfer of electrons from the reducing gas flowing in one cell to the oxidizing gas flowing in another cell. The anode 18 and cathode 22 plates of two adjacent cells of the stack are preferably integral and together form a bipolar plate. The anode conduits 20 of the different cells 15 of the stack are fluidly connected to one another to form an anode compartment of the stack 12, and the cathode conduits 24 of the different cells 15 of the stack are fluidly connected to one another to form a cathode compartment of the stack 12.

The fuel cell system 10 also comprises a first supply conduit 30 supplying the anode compartment with reducing fluid, a second supply conduit 32 supplying the cathode compartment with oxidizing fluid, a first pressure sensor 34 to measure the fluid pressure in the anode compartment, a second pressure sensor 36 to measure the fluid pressure in the cathode compartment, a first pressure regulator 38 to regulate the fluid pressure in the cathode compartment, a second pressure regulator 39 to regulate the fluid pressure in the anode compartment, and a controller or module 40 to control the pressure regulators 38, 39.

The first conduit 30 is fluidly connected to a reducing fluid source and to a fluid inlet of the anode compartment of the fuel cell 12.

The second conduit 32 is fluidly connected to an oxidizing fluid source and to a fluid inlet of the cathode compartment of the fuel cell 12.

The first sensor 34 is suitable for measuring the fluid pressure in the first conduit 30, near the inlet of the anode compartment. It will be noted that the fluid pressure in the first conduit 30 near the inlet of the anode compartment being substantially equal to the fluid pressure in the anode compartment, this amounts to measuring the fluid pressure in the anode compartment.

The second sensor 36 is suitable for measuring the fluid pressure in the second conduit 32, near the inlet of the cathode compartment. It will be noted that the fluid pressure in the second conduit 32 near the inlet of the cathode compartment being substantially equal to the fluid pressure in the cathode compartment, this amounts to measuring the fluid pressure in the cathode compartment.

The first pressure regulator 38 is connected on the second conduit 32, upstream from the pressure measuring point of the second sensor 36. It is fluidly inserted between the oxidizing fluid source and the inlet of the cathode compartment. The first regulator 38 is preferably a valve, for example a solenoid valve.

The second pressure regulator 39 is connected on the first conduit 30, upstream from the pressure measuring point of the first sensor 34. It is fluidly inserted between the reducing fluid source and the inlet of the anode compartment. The second regulator 39 is preferably a valve, for example a solenoid valve.

The control module 40 comprises a first calculating module 42, a first generating module 43, a first computing module 45, a first comparison module 46, a first stoppage module 48, a first startup module 49, a second calculating module 52, a second generating module 53, a second computing module 55, a second comparison module 56, a second stoppage module 58, and a second startup module 59.

The first calculating module 42 is suitable for calculating a first target pressure from the pressure measured by the first sensor 34. Said first target pressure is for example equal to the sum of the fluid pressure measured by the first sensor 34 and a first constant. The first constant is for example comprised between 1 and 500 mBar.

The first generating module 44 is suitable for generating a first control law of the first regulator 38, suitable for stabilizing the fluid pressure in the second compartment at the first target pressure.

The first computing module 45 is suitable for computing a first pressure difference between the fluid pressure measured by the second sensor 36 and the first target pressure.

The first comparison module 46 is suitable for comparing the first pressure difference to a first threshold. The first threshold is for example comprised between 1 and 500 mBar.

The first stoppage module 48 is suitable for stopping the first generating module 43 if the first pressure difference exceeds the first threshold.

The first start up module 49 is suitable for starting the second generating module 53 if the first pressure difference exceeds the first pressure difference threshold.

The second calculating module 52 is suitable for calculating a second target pressure from the pressure measured by the second sensor 36. Said second target pressure is for example equal to the sum of the fluid pressure measured by the second sensor 36 and a second constant. The second constant is for example comprised between 1 and 500 mBar.

The second generating module 53 is suitable for generating a second control law of the second regulator 39, suitable for stabilizing the fluid pressure in the first compartment at the second target pressure.

The second computing module 55 is suitable for computing a second pressure difference between the fluid pressure measured by the first sensor 34 and the second target pressure.

The second comparison module 56 is suitable for comparing the second pressure difference to a second threshold. The second threshold is for example comprised between 1 and 500 mBar.

The second stoppage module 58 is suitable for stopping the second generating module 53 if the second pressure difference exceeds the second threshold.

The second start up module 59 is suitable for starting the first generating module 43 if the second pressure difference exceeds the second pressure difference threshold.

A method for controlling the fuel cell system 10 will now be described, in reference to FIG. 1.

Initially, the fluid pressure in the cathode compartment is generally controlled based on the fluid pressure in the anode compartment. To that end, the fluid pressure in the anode compartment is measured by the first sensor 34, the first target pressure is calculated by the first calculating module 42, and a control law suitable for stabilizing the fluid pressure in the cathode compartment at the first target pressure is generated by the first generating module 43. The fluid pressure in the cathode compartment is then stabilized at the first target pressure by the first pressure regulator 38.

At the same time, the first pressure difference between the pressure measured by the second sensor 36 and the first target pressure is computed by the first computing module 45, and said first pressure difference is compared to the first threshold by the comparison module 46.

If the first pressure difference exceeds the first threshold, the first comparison module 46 sends a signal to the first stoppage 48 and start up 49 modules. The first stoppage module 48 then commands the stoppage of the first generating module 43, and the first start up module 49 commands the start up of the second generating module 53. The fluid pressure in the cathode compartment thus ceases to be stabilized at the first target pressure, and the fluid pressure in the anode compartment begins to be stabilized at the second target pressure by the second pressure regulator 39.

In particular, after the start up of the second generating module 53 the fluid pressure in the cathode compartment is measured by the second sensor 36, the second target pressure is calculated by the second calculating module 52, and a control law suitable for stabilizing the fluid pressure in the cathode compartment at the second target pressure is generated by the second generating module 53.

At the same time, the second pressure difference between the pressure measured by the first sensor 34 and the second target pressure is computed by the second computing module 55, and said second pressure difference is compared to the second threshold by the comparison module 56.

If the second pressure difference exceeds the second threshold, the second comparison module 56 sends a signal to the second stoppage 58 and start up 59 modules. The second stoppage module 48 then commands the stoppage of the second generating module 53, and the second start up module 59 commands the start up of the first generating module 43. The fluid pressure in the anode compartment thus ceases to be stabilized at the second target pressure, and the fluid pressure in the cathode compartment begins to be stabilized again at the first target pressure by the first pressure regulator 38: the fuel cell system 1 has then returned to its initial state.

The preceding steps are repeated until the fuel cell system 10 is stopped.

Owing to the above description, the pressure deviations between the compartments of the fuel cell are better controlled. It is thus possible to guarantee a good lifetime of the membranes 26 of the cells 15 of the fuel cell 12, while limiting the safety stoppages.

What is claimed is:

1. A method for controlling a fuel cell, the fuel cell comprising at least one electrochemical cell for generating an electric current by reaction of an oxidizing fluid, flowing in a cathode compartment of the fuel cell, with a reducing fluid flowing in an anode compartment of the fuel cell, the method comprising:
   measuring a fluid pressure in a first compartment constituted by one of the anode and the cathode compartments;
   calculating a first target pressure for the fluid pressure in a second compartment constituted by the other one of the anode and the cathode compartments, the first target pressure depending on the fluid pressure measured in the first compartment;
   stabilizing a fluid pressure in the second compartment at the first target pressure;
   measuring the fluid pressure in the second compartment;
   calculating a second target pressure for the fluid pressure in the first compartment, the second target pressure depending on the fluid pressure measured in the second compartment; and
   stabilizing the fluid pressure in the first compartment at the second target pressure.

2. The control method according to claim 1, wherein the first target pressure is equal to a sum of the fluid pressure measured in the first compartment and a first constant, and the second target pressure is equal to a sum of the fluid pressure measured in the second compartment and a second constant.

3. The control method according to claim 1, wherein the stabilizating of the fluid pressure in each compartment is done using a valve.

4. The control method according to claim 3, wherein the valve is a solenoid valve.

5. The control method according to claim 1, further comprising:
   computing a first pressure difference between the fluid pressure in the second compartment and the first target pressure;
   comparing the first pressure difference to a first threshold; and
   if the first pressure difference exceeds the first threshold, stopping the stabilization of the fluid pressure in the second compartment at the first target pressure, and starting the stabilization of the fluid pressure in the first compartment at the second target pressure.

6. The control method according to claim 5, further comprising:
   computing a second pressure difference between the fluid pressure in the first compartment and the second target pressure;
   comparing the second pressure difference to a second threshold; and
   if the second pressure difference exceeds the second threshold, stopping the stabilization of the fluid pressure in the first compartment at the second target pressure, and starting the stabilization of the fluid pressure in the second compartment at the first target pressure.

7. A fuel cell system, comprising:
   a cathode compartment;
   an anode compartment;
   at least one electrochemical cell for generating an electric current by reaction of an oxidizing fluid, flowing in the cathode compartment, with a reducing fluid flowing in the anode compartment;
   a first pressure sensor configured to measure a fluid pressure in a first compartment constituted by one of the anode and cathode compartments;
   a first pressure regulator configured to regulate a fluid pressure in a second compartment constituted by the other one of the anode and cathode compartments; and
   a controller comprising:
      a first calculating module configured to calculate a first target pressure from the pressure measured by the first sensor; and
      a first generating module configured to generate a first control law of the first regulator, configured for stabilizing the fluid pressure in the second compartment at the first target pressure;
      a second pressure sensor configured to measure a fluid pressure in the second compartment;
      a second pressure regulator configured to regulate the fluid pressure in the first compartment;
      a second calculating module to calculate a second target pressure from the pressure measured by the second sensor; and
      a second generating module to generate a second control law of the second pressure regulator, configured for stabilizing the fluid pressure in the first compartment at the second target pressure.

8. The fuel cell system according to claim 7, wherein the first target pressure is equal to the sum of the fluid pressure measured by the first sensor and a first constant, and the second target pressure is equal to a sum of the fluid pressure measured by the second sensor and a second constant.

9. The fuel cell system according to claim 7, wherein each pressure regulator is a valve.

10. The fuel cell system according to claim 9, wherein the valve is a solenoid valve.

11. The fuel cell system according to claim 7, wherein the controller comprises:
    a first computing module configured for computing a first pressure difference between the fluid pressure measured by the second sensor and the first target pressure;
    a first comparison module configured to compare the first pressure difference to a first threshold;
    a first stoppage module configured to stop the first generating module if the first pressure difference exceeds the first threshold; and a first start-up module configured to start the second generating module if the first pressure difference exceeds the first threshold.

12. The fuel cell system according to claim 11, wherein the controller comprises:
   a second computing module configured for computing a second pressure difference between the fluid pressure measured by the first sensor and the second target pressure;
   a second comparison module configured to compare the second pressure difference to a second threshold;
   a second stoppage module configured to stop the second generating module if the second pressure difference exceeds the second threshold; and
   a second start-up module configured to start the first generating module if the second pressure difference exceeds the second threshold.

* * * * *